May 22, 1945.  F. REAVILL  2,376,723

POTATO HARVESTING MACHINE

Filed Nov. 19, 1942  3 Sheets-Sheet 1

Inventor:
Frederick Reavill
By: Mason, Porter & Diller
Attorneys

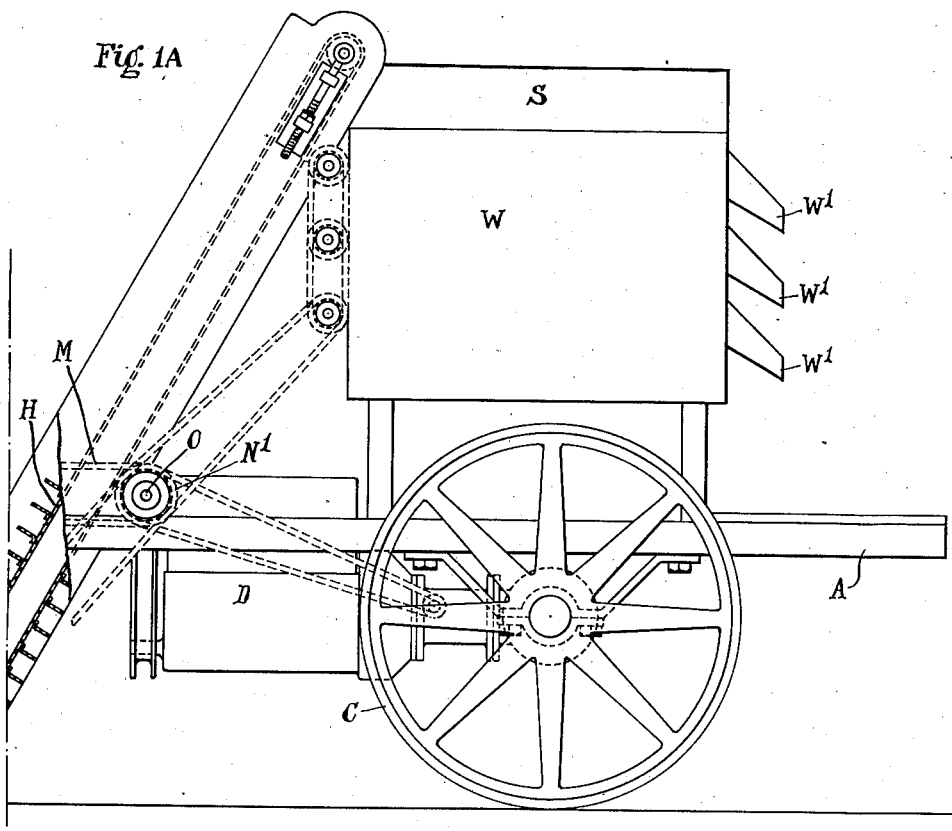
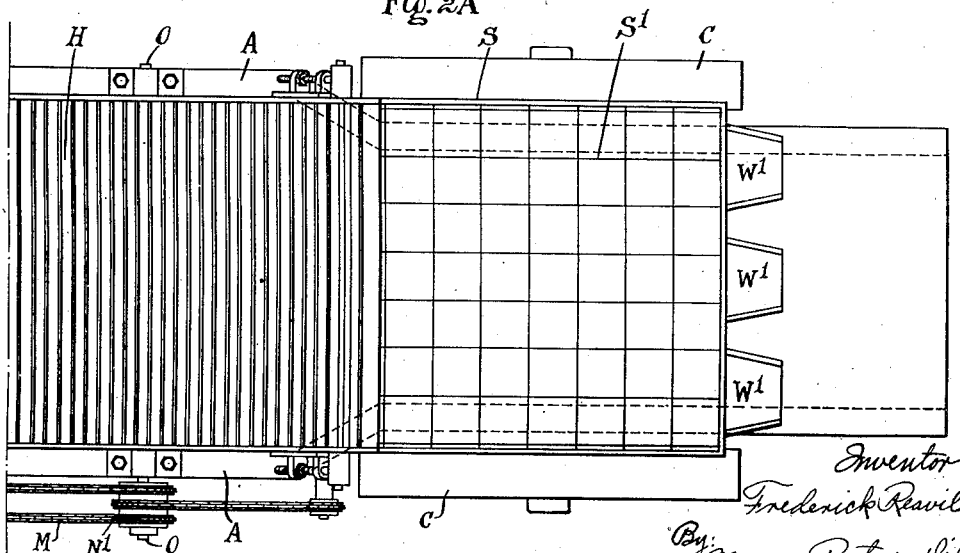

May 22, 1945.　　　F. REAVILL　　　2,376,723
POTATO HARVESTING MACHINE
Filed Nov. 19, 1942　　　3 Sheets-Sheet 3

Patented May 22, 1945

2,376,723

UNITED STATES PATENT OFFICE 2,376,723

POTATO HARVESTING MACHINE

Frederick Reavill, Beeston, England

Application November 19, 1942, Serial No. 466,194
In Great Britain November 28, 1941

9 Claims. (Cl. 55—9)

This invention relates to an improved potato harvesting machine and its object is to provide a machine which will lift the potatoes when they are ripe and convey them to a hopper from which they can be fed into a vehicle for conveyance to another point or if desired fed direct to a grading and weighing machine.

According to this invention the potato harvesting machine comprises a preferably mechanically propelled vehicle provided at the front with one or more oscillating potato lifters adapted to lift and deliver the potatoes to a conveyor which feeds the potatoes into a hopper on the vehicle and from which they can be fed either to another vehicle or else to a grading and weighing machine mounted on the machine.

Figure 1:
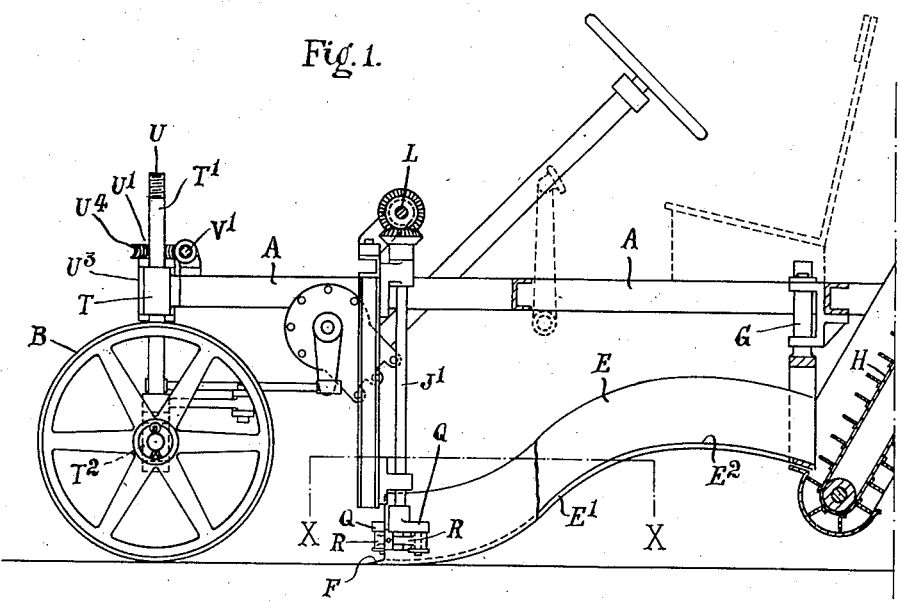

The invention will now be more particularly described with reference to the accompanying drawings in which:

Figures 1 and 1A together comprise a side elevation illustrating the improved potato harvesting machine.

Figure 2:
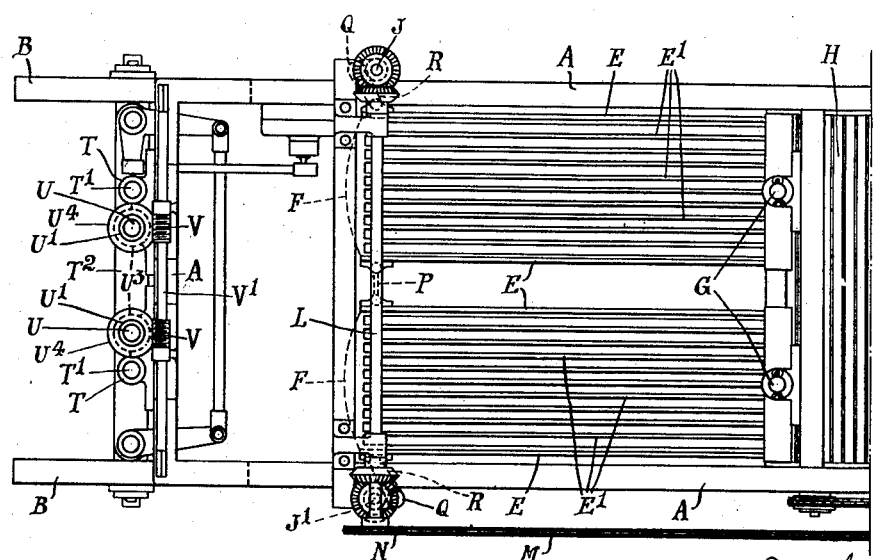

Figures 2 and 2A together comprise a plan view of the machine illustrated in Figures 1 and 1A.

Figure 3:
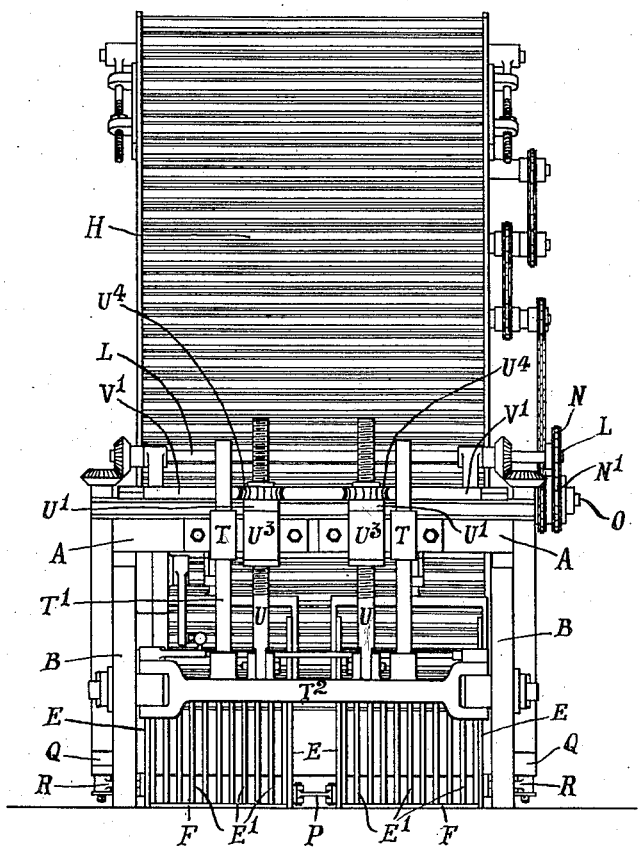

Fig. 3 a front elevation of a potato harvesting machine constructed according to this invention.

Figure 4:
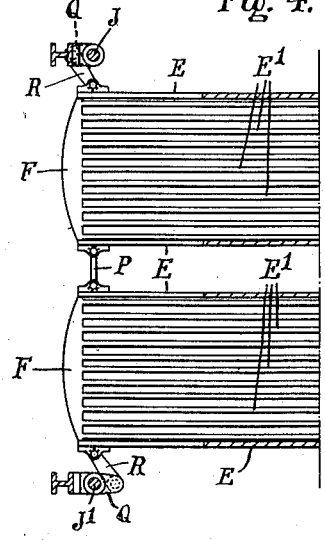

Figure 4 is a detail horizontal sectional view taken on the line X—X on Figure 1.

Like letters indicate like parts throughout the drawings.

In carrying out this invention the harvesting machine is preferably a four wheeled mechanically driven vehicle comprising a main frame A, front wheels B adapted to be turned for steering purposes, rear wheels C and a power unit D. Disposed at the front of the vehicle is a potato lifting device which comprises one or more substantially trough shaped members E provided at the front end with a preferably removable cutting member F adapted, when the vehicle is moved forward, to cut along the bottom of the raised drills in which potatoes are normally grown. Each member E is adapted to cut along the bottom of one drill and the number of members E provided in the machine depends upon the number of drills to be treated at the same time. The members E hereinafter referred to as lifters may be carried by arms hinged to the vehicle so that they can be raised out of action when not required but in the preferred construction shown in the drawings the lifters E are raised out of action by raising the main framing A relatively to the front wheels B as hereinafter explained. The rear end of each lifter E is pivoted at G to the main frame A and disposed over the lower end of a conveyor H. If desired their forward ends may be further supported by a pair of links disposed between the front end of the lifters E and a cross member on the main frame A and so arranged that they will permit movement of the members from side to side about their pivots G. The front end of the lifters E are lowered into operative position to cut along the bottom of the drills by lowering the main frame A relatively to the front wheels, that is into the position shown in Fig. 1 of the drawings. The machine illustrated in the drawings is provided with two trough shaped members or lifters E spaced the requisite distance apart to cut along two adjacent drills at the same time but it will be understood that any convenient number of lifters may be provided to cut along a corresponding number of drills. In order to facilitate the operation of cutting along the drills the front end of the lifters are oscillated from side to side. The oscillating movement is obtained by mechanism hereinafter described which may be driven from the wheels of the machine but is preferably driven from the power unit D provided for propelling the machine.

The mechanism for oscillating the lifters comprises two substantially vertical shafts J, J$^1$ disposed one on each side of the main framing A. The shafts J, J$^1$ are rotated by a cross shaft L, connected to the shafts J, J$^1$ by bevel gearing, and driven by a chain M and sprockets N, N$^1$ from the cross shaft O which is in turn driven by a chain from the power unit D. The adjacent sides of the lifters E are connected together by a link P and in order to oscillate the members E when the shafts J, J$^1$ are rotated cam discs may be provided on the lower ends of the shafts to engage rollers carried on the outer sides of the lifters E, or as shown in the drawings cranks Q are secured on the lower ends of the shafts J, J$^1$ and these cranks are connected by links R to the sides of the members E.

The bottom of the lifters E are in the form of a grid and may be made from sheet metal provided with the necessary openings but are preferably built up from metal rods E$^1$ secured to cross members at the front and rear ends. The bottom is shaped so that it first rises upwards to a point E$^2$ which is above the tops of the drills and about two thirds the length of the lifter from the front end and then curves downwards towards the rear end. The latter is pivoted as previously mentioned over the lower end of a conveyor H which may be of the belt or bucket type and is driven from the power unit of the vehicle by chain and sprocket gearing or other convenient means or from the wheels of the vehicle and is adapted to convey the material fed thereto by the lifters E into a hopper S disposed on the vehicle.

In operation the lifters E are set so that the front end cuts along the raised drills in which the potatoes are grown at a point below the latter so that as the vehicle is driven along the drills, the earth forming the drills and potatoes therein are forced onto the bottom of the lifters and along the latter. Owing to the rise of the fore part of the bottom of the lifters and its grid formation the earth and small stones fall through the bottom and only the potatoes and the potato tops pass over the highest point. The passage of the soil through the bottom of the lifters E is further assisted by the oscillating motion of the latter.

The potatoes and the potato tops fall down the inclined rear part of the lifters E onto the conveyor H and are delivered by the latter into the hopper S on the vehicle.

In order to adjust the position of the front end of the lifters E and to lift them out of action when not required, the front end of the frame A is provided with bearings T adapted to slide on shafts $T^1$ secured to the front axle $T^2$ and in order to raise and lower the front of the framing A and consequently the lifters E the following arrangement is provided. Secured to the front axle $T^2$ are two screw threaded shafts U which engage in nuts $U^1$ rotatably mounted in bearings $U^3$ secured to the front of the framing A. Secured to the nuts $U^1$ are worm wheels $U^4$ which engage with worms V on a cross shaft $V^1$ manually rotated by a crank handle so that by turning the shaft $V^1$ in the appropriate direction the nuts $V^1$ can be rotated and the front of the framing A raised or lowered relatively to the front axle of the machine.

The hopper is provided at its upper end with a reciprocating screen $S^1$. This screen is reciprocated by any convenient means driven from the power unit or wheels of the vehicle. The screen separates the potato tops from the potatoes and its motion shakes off any potatoes still adhering to the tops so that only the potatoes and any stones which were too large to pass through the bottom of the lifters E pass into the bottom of the hopper.

The potatoes and stones collected in the hopper may pass down a chute and into another vehicle travelling alongside and be subsequently taken away for sorting and grading or they may be treated as hereinafter described.

The potatoes' tops collected by the screen $S^1$ associated with the hopper S are removed manually and may be transferred to a cutting machine mounted at a convenient place on the vehicle and adapted to cut them up into small pieces and either return them to the ground to rot and be subsequently ploughed in or feed them into bags for removal elsewhere.

If preferred the potatoes may be fed from the hopper direct to a grading machine W carried on the vehicle. The grading machine may be of well known type comprising a number of reciprocated screens and driven by the power unit or the wheels of the vehicle.

The potatoes collected by the screens are fed to chutes $W^1$ adapted to feed the potatoes into sacks. The sacks are attached to the end of the chutes and may stand on weighing scales which are adapted to automatically close the chutes when the required weight of potatoes has been fed into the sacks when they are removed by the attendants and a fresh sack placed in position.

The attendants also remove any large stones from the screens and place these in receptacles provided for the purpose. The receptacles can be emptied when the machine is at the end of the drills. The small stones and potatoes too small to be of use are fed to a crushing machine which crushes them and returns them to the ground.

It will be appreciated that when a potato crop has been harvested by the machine all large stones will have been removed from the soil and smaller ones crushed so that in subsequent years no trouble will arise in this connection.

With the machine described a potato crop can be lifted and transferred to another vehicle or graded and weighed ready for sale in much less time and with a considerable saving in labor and expense over the methods in use hitherto. The potato tops are cut up and returned to the ground in a more suitable condition for ploughing in and the ground is cleared of stones the first time the machine is used.

What I claim as my invention is:

1. A potato harvesting machine comprising in combination a main framing supported on wheels, at least one trough shaped member disposed longitudinally of and being pivoted at its rear end to the main framing so that the front end of said member will cut along the bottom of a drill, said member being inclined upwardly from front to rear to lift the potatoes from said drill, means to oscillate the trough shaped member from side to side as said member cuts along the drill, and a conveyor behind said trough shaped member to receive the potatoes lifted from the drill and deliver them into a hopper.

2. A potato harvesting machine comprising in combination a main framing supported on wheels, at least one trough shaped member disposed longitudinally of and carried by the main framing so that the front end of said member cuts along a drill and lifts the potatoes from said drill, a grid to form the bottom of the trough shaped member and having its rear end disposed at a higher level than the front and rising from the front to a high point intermediate its ends which is at a higher level than the rear end and is above the top of the drill, means mounting said member on said main framing for horizontal oscillating movement, means for imparting horizontal oscillatory movement to said member, and a conveyor behind the trough shaped member to receive the potatoes lifted from the drill and deliver them into a hopper.

3. A potato harvesting machine comprising in combination a main framing supported on wheels, at least one trough shaped member disposed longitudinally of and being pivoted at its rear end to the main framing so that the front end of said member will cut along a drill and lift the potatoes from said drill, a bottom in the trough shaped member comprising a grid having its rear end disposed at a higher level than the front end and rising from the front to a point intermediate its ends which is at a higher level than the rear end and is above the top of the drill, means to oscillate the front of the trough shaped member from side to side as said member cuts along the drill, and a conveyor behind the trough shaped member to receive the potatoes lifted from the drill and deliver the potatoes into a hopper.

4. A potato harvesting machine comprising in combination a main framing supported on wheels, at least one trough shaped member disposed longitudinally of and being pivoted at its rear end to the main framing so that the front end of said member will cut along a drill, a vertical shaft mounted on the main framing, a crank on the lower end of the shaft, a link connecting the crank to the side of the trough shaped member and near to the front of said member, means to rotate the vertical shaft to oscillate the front end of the trough shaped member from side to side, and a conveyor behind the trough shaped member to receive the potatoes lifted from the drill and deliver them into a hopper.

5. A potato harvesting machine comprising in combination a main framing supported on wheels, at least one trough shaped member disposed longitudinally of and being pivoted at its rear end to the main framing so that the front end of said member will cut along a drill, means to oscillate the front end of the trough shaped member from side to side, a bottom in the trough shaped member comprising a grid which is higher at the rear end than the front and rises from the front to a point intermediate its ends which is higher than the rear end and is above the tops of the drill, means to raise and lower the main framing relatively to the ground to adjust the position of the front end of the trough shaped member to the depth of the drill, and a conveyor behind the trough shaped member to receive the potatoes lifted from the drill and deliver them into a hopper.

6. A potato harvesting machine comprising in combination a main framing, a pair of supporting wheels mounted on an axle disposed at the front of the main framing, a pair of supporting wheels disposed at the rear thereof, at least one trough shaped member disposed longitudinally of and being pivoted at its rear end to the main framing so that the front end of said member will cut along a drill, means to oscillate the trough shaped member from side to side, a bottom in the trough shaped member comprising a grid which is higher at the rear end than the front and rises from the front to a point intermediate its ends which is higher than the rear end and is above the top of the drill, screws attached to the front axle, nuts on the main framing to engage the screws, means to rotate the nuts to raise and lower the front of the main framing to adjust the position of the front end of the trough shaped member relatively to the ground, and a conveyor behind the trough shaped member to receive the potatoes lifted from the drill and deliver them into a hopper.

7. A potato harvesting machine comprising in combination a main framing, a pair of wheels disposed at the front end thereof, at least one oscillating trough shaped member disposed longitudinally of and being pivoted at its rear end to the main framing, a bottom in the trough shaped member comprising a grid which is higher at the rear end than the front and rises from the front to a point intermediate its ends which is higher than the rear end and is above the top of a drill, screws connected to the axle of the front pair of wheels, nuts on the main framing engaging the screws, worm wheels secured to the nuts, worms on a cross shaft engaging the worm wheels, means to rotate the cross shaft to raise and lower the front of the main framing to adjust the position of the front end of the trough shaped member relative to the ground, and a conveyor behind the trough shaped member to receive the potatoes lifted from the drill and deliver them into a hopper.

8. A potato harvesting machine comprising in combination a main framing, wheels to support the framing, at least one trough shaped member disposed longitudinally of and being pivoted at its rear end to the main framing so that front end of said member will cut along a drill, means to oscillate the front end of the trough shaped member, a bottom in the trough shaped member comprising a grid which is higher at the rear end than the front and rises from the front to a point intermediate its ends which is higher than the rear end and is above the top of the drill, means to adjust the position of the front end of the trough shaped member relatively to the ground, a conveyor behind the trough shaped member to receive the potatoes lifted from the drill and deliver the potatoes into a hopper, and a power unit carried by the main framing to drive the machine and drive the conveyor and the means to oscillate the trough shaped member.

9. A potato harvesting machine comprising in combination a main framing supported on wheels, at least one trough shaped member disposed longitudinally of and being pivoted to the main framing so that the front end of said member will cut along the drill and lift the potatoes therefrom, a bottom in the trough shaped member comprising a grid which is higher at the rear end than the front and rises from the front to a point intermediate its ends which is higher than the rear end and is above the top of the drill, means to oscillate the trough shaped member from side to side, and a conveyor behind the trough shaped member to receive the potatoes lifted from the drill and deliver the potatoes into a hopper.

FREDERICK REAVILL.